(12) United States Patent
Raoul

(10) Patent No.: US 7,950,480 B2
(45) Date of Patent: May 31, 2011

(54) HYBRID POWER TRAIN AND OPERATING METHOD THEREFOR

(75) Inventor: Michel Raoul, Elancourt (FR)

(73) Assignee: RENAULT s.a.s, Boulogne Billancourt (FR)

( * ) Notice: Subject to any disclaimer, the term of this patent is extended or adjusted under 35 U.S.C. 154(b) by 919 days.

(21) Appl. No.: 11/579,055

(22) PCT Filed: Apr. 27, 2005

(86) PCT No.: PCT/FR2005/050283
§ 371 (c)(1),
(2), (4) Date: Dec. 14, 2006

(87) PCT Pub. No.: WO2005/110795
PCT Pub. Date: Nov. 24, 2005

(65) Prior Publication Data
US 2007/0187160 A1 Aug. 16, 2007

(30) Foreign Application Priority Data
Apr. 29, 2004 (FR) .................................... 04 50822

(51) Int. Cl.
*B60K 6/00* (2007.10)
*B60K 6/48* (2007.10)
(52) U.S. Cl. ................................. 180/65.25; 180/65.22
(58) Field of Classification Search ................. 180/65.1, 180/65.21, 65.22, 65.235, 65.6, 65.7, 292, 180/378, 65.5; 477/3, 6
See application file for complete search history.

(56) References Cited

U.S. PATENT DOCUMENTS

| 4,270,638 | A | * | 6/1981 | Sassi | 192/45.1 |
| 4,895,049 | A | * | 1/1990 | Kita et al. | 475/76 |
| 5,022,506 | A | * | 6/1991 | Philippe | 192/53.32 |
| 6,142,907 | A | * | 11/2000 | Minowa et al. | 477/5 |
| 6,149,544 | A | * | 11/2000 | Masberg et al. | 477/13 |
| 6,254,507 | B1 | * | 7/2001 | Downs | 477/4 |
| 6,299,563 | B1 | * | 10/2001 | Shimasaki | 477/5 |
| 6,374,691 | B1 | * | 4/2002 | Grundberg et al. | 74/473.12 |
| 6,557,656 | B2 | * | 5/2003 | Haniu et al. | 180/65.6 |
| 6,585,066 | B1 | * | 7/2003 | Koneda et al. | 180/65.25 |
| 6,656,069 | B2 | * | 12/2003 | Sugano | 474/28 |
| 6,881,169 | B2 | * | 4/2005 | Katakura | 477/3 |
| 7,082,850 | B2 | * | 8/2006 | Hughes | 74/329 |
| 7,185,722 | B1 | * | 3/2007 | Sakamoto et al. | 180/65.25 |
| 7,250,017 | B2 | * | 7/2007 | Asa et al. | 475/8 |
| 7,367,416 | B2 | * | 5/2008 | Seufert et al. | 180/65.31 |
| 7,694,761 | B2 | * | 4/2010 | Noiret | 180/65.21 |
| 2001/0024994 | A1 | * | 9/2001 | Sugano | 477/2 |
| 2001/0042647 | A1 | * | 11/2001 | Sakamoto et al. | 180/65.2 |
| 2002/0093202 | A1 | * | 7/2002 | Downs et al. | 290/40 R |
| 2002/0177504 | A1 | * | 11/2002 | Pels et al. | 477/3 |
| 2003/0054920 | A1 | * | 3/2003 | Berger et al. | 477/70 |
| 2003/0217617 | A1 | * | 11/2003 | Sakamoto et al. | 74/665 B |

FOREIGN PATENT DOCUMENTS

DE         31 22 319        12/1982
(Continued)

*Primary Examiner* — J. Allen Shriver, II
*Assistant Examiner* — Jacob Meyer
(74) *Attorney, Agent, or Firm* — Oblon, Spivak, McClelland, Maier & Neustadt, L.L.P.

(57) ABSTRACT

A hybrid motor vehicle power train operating in thermal mode or electric mode includes a thermal engine coupled to a gearbox via a clutch and an electrical machine. The electrical machine is continuously connected to the input shaft of the gearbox.

11 Claims, 2 Drawing Sheets

FOREIGN PATENT DOCUMENTS

| | | |
|---|---|---|
| EP | 1 232 890 | 8/2002 |
| EP | 1 232 891 | 8/2002 |
| EP | 1232891 A1 * | 8/2002 |
| EP | 1 273 825 | 1/2003 |
| EP | 1318319 | 6/2003 |
| FR | 2 821 652 | 9/2002 |
| FR | 2 822 109 | 9/2002 |
| FR | 2822109 A1 * | 9/2002 |
| FR | 2 822 758 | 10/2002 |
| FR | 2833329 | 6/2003 |
| FR | 2 834 248 | 7/2003 |
| FR | 2834248 A1 * | 7/2003 |
| FR | 2837429 | 9/2003 |
| WO | 91/08919 | 6/1991 |

\* cited by examiner

HYBRID POWER TRAIN AND OPERATING METHOD THEREFOR

BACKGROUND OF THE INVENTION

I. Field of the Invention

The invention relates to a motor vehicle power train with a hybrid, electric and combustion, drive comprising two drive units, one an electric motor and the other a combustion engine, operating mainly in combustion mode.

More specifically, the subject of the invention is a hybrid motor vehicle power train operating in combustion mode or in electric mode, of the type comprising a combustion engine coupled to a gearbox via a clutch, and an electric machine.

II. Description of Related Art

Various ways of arranging an electric machine in a hybrid power train are known.

In one known arrangement, illustrated in particular by the publications FR 2 822 109 and FR 2 837 429, the stator of the electric machine can be fixed to the gearbox housing, itself secured to the housing of the combustion engine, while the rotor is connected to the planet pinion of a planetary gear train.

In another known arrangement, in particular that known from publication EP 1 232 890, the electric machine can be placed in a lateral position of the gearbox, the electric machine then being permanently connected to the secondary shaft by a chain and a pair of wheels added to the end of the primary and secondary shafts.

The disadvantage with these known arrangements is the additional axial bulk of the power train, which cannot be made compatible with transverse installations without difficulty.

BRIEF SUMMARY OF THE INVENTION

To overcome this disadvantage, the invention proposes that the electric machine is permanently connected to the primary shaft of the gearbox, preferably by a chain, and offset laterally with respect to the combustion engine.

It also proposes that:
with the vehicle stopped, the combustion engine is started by putting the gearbox in the neutral position and by closing the clutch for coupling the crankshaft and the input shaft of the gearbox, that
with the vehicle running in electric mode, the combustion engine is started by closing the clutch for coupling the crankshaft and the input shaft of the gearbox, that
the power train has a main combustion operating mode, the electric machine then performing the functions of alternator, of motor for applying extra torque at the low speeds of the combustion engine, and of an electric brake when slowing down, that
the power train has an electric operating mode, the clutch for coupling the crankshaft and the input shaft of the gearbox then being open, and the electric machine then being able to propel the vehicle forward in the first and second gear ratios of the gearbox and in reverse by reversing the direction of rotation, in the second gear ratio, and that
the gearbox is robotized.

BRIEF DESCRIPTION OF THE DRAWINGS

Other features and advantages of the invention will become clearly apparent on reading the detailed description given below of an embodiment which does not limit the invention, with reference to the appended drawings, in which.

DETAILED DESCRIPTION OF THE INVENTION

Figure 1:
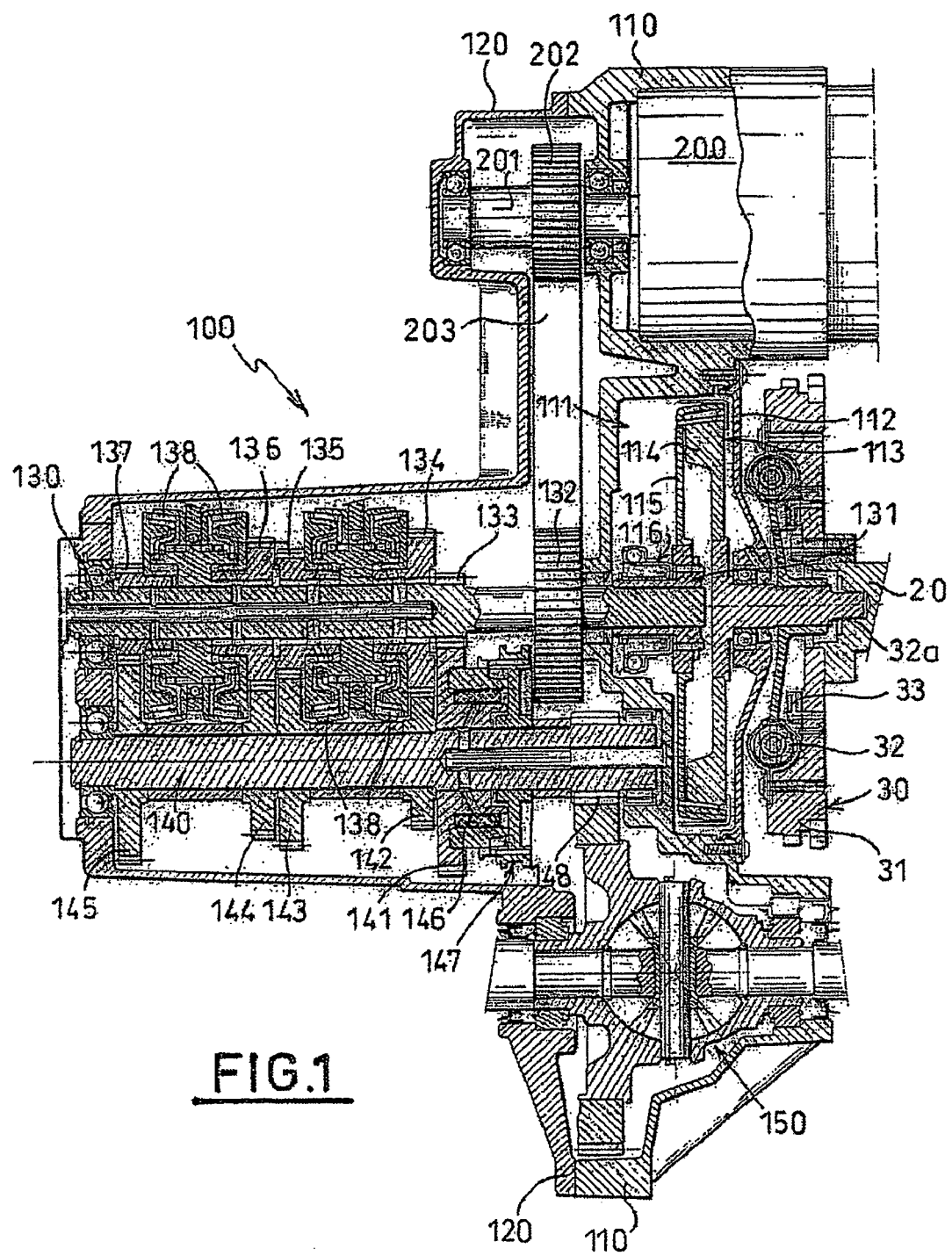
FIG. 1 is an axial overview of the proposed power train, without the combustion engine.

FIG. 1 shows the whole of the power train 10. The combustion engine 20 is represented by way of the nose of the crankshaft, to which is fastened a damping flywheel 30 composed of an actual flywheel 31, of a vibration damper 32 and of a damping device 33, corresponding, for example, to publication FR 2 833 329.

The combustion engine is coupled via splines 32a of the damper to a gearbox 100 which is composed of a clutch and differential housing 110 and of a mechanism housing 120. The clutch housing comprises a first compartment 111 closed by a flange 112 and containing a conical clutch 113, the entry cone 114 of which is connected to the damper 32, like the one disclosed in publication EP 1 318 319. The clutch is opened and closed by way of the bearing 116. The upper ring 115 of the clutch 113 is connected to the input or primary shaft of the gearbox 100 via a hub 131.

Situated from right to left on the primary shaft 130 are a first fixed drive wheel 132 of the electric machine 200, a fixed toothing 133 of the first gear ratio, a first freely rotating pinion 134 of the fifth gear ratio, a second freely rotating pinion 135 of the third gear ratio, a third freely rotating pinion 136 of the fourth gear ratio, and a fourth freely rotating pinion 137 of the second gear ratio. These freely rotating pinions can be secured individually with the primary shaft by means of identical coupling devices 138, for example "conical couplers" of the type proposed by publication FR 2 821 652. The fixed and freely rotating pinions of the primary shaft mesh with a freely rotating pinion and with fixed pinions borne by the secondary shaft 140, namely, from right to left, a freely rotating pinion 141 of the first gear ratio, a first fixed pinion 142 of the fifth gear ratio, a second fixed pinion 143 of the third gear ratio, a third fixed pinion 144 of the fourth gear ratio, and a fourth fixed pinion 145 of the second gear ratio.

The freely rotating pinion 141 of the first gear ratio can be secured with the secondary shaft 140 via a free wheel 146, according to an arrangement illustrated by publication EP 1 273 825, and via a conventional synchronizing and dog-clutching device 147. Finally, the secondary shaft bears a fixed toothing 148 for transmitting movement to a conventional differential 150.

The electric machine 200, borne by the clutch housing 110, drives a shaft 201 having a single fixed toothing 202 connected to the primary shaft 130 by a chain 203.

Figure 2:
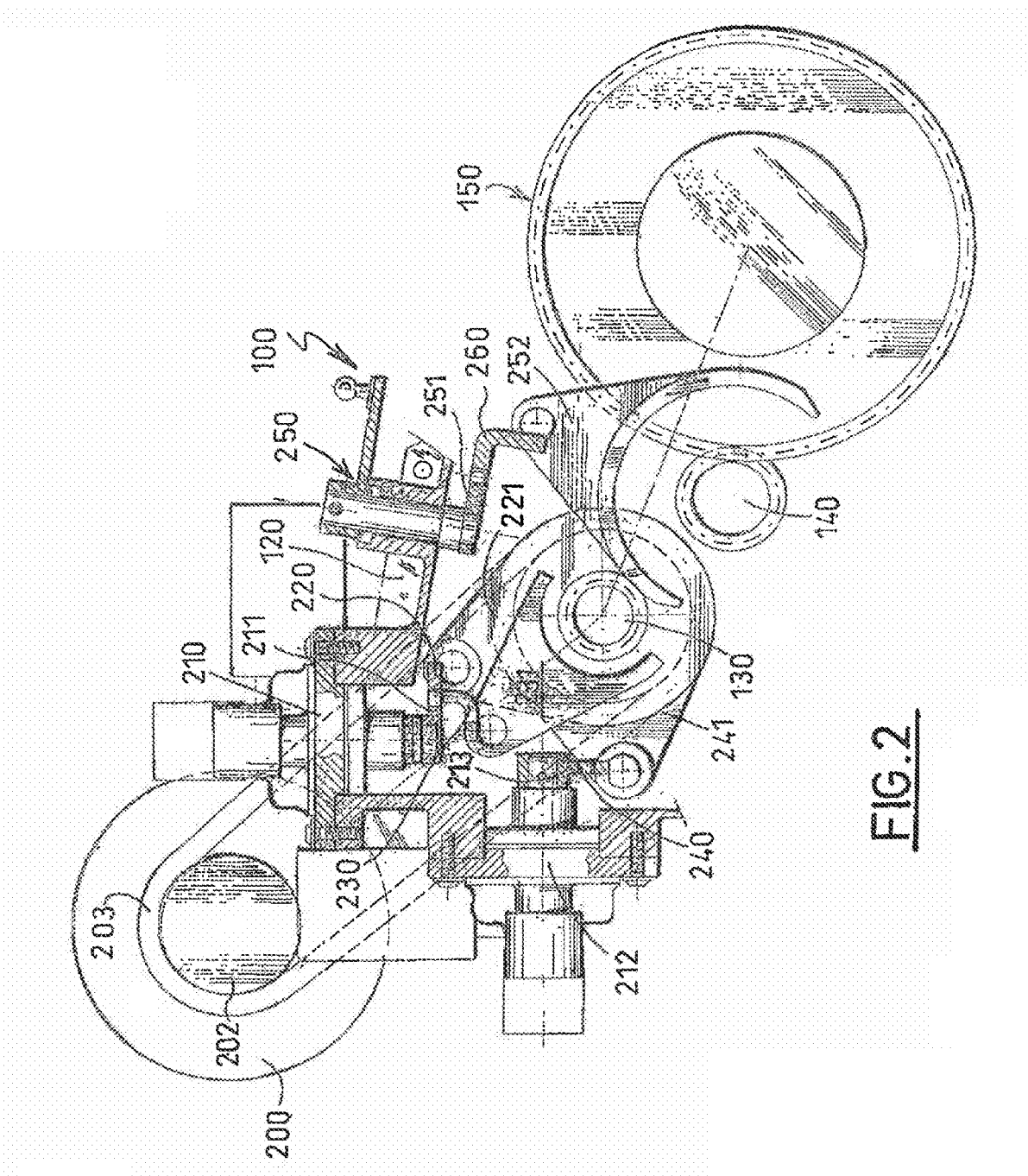
FIG. 2 is a partial cross section thereof.

FIG. 2 shows the control system and the relative position of the electric machine 200. The control system is borne by the mechanism housing. This figure is a partial cross section of the gearbox 100 and shows a first electromechanical actuator 210 (as described, for example, in publication EP 1 229 274) in an upper position, the finger 211 of which can cooperate with a first dog sleeve 220 for controlling the coupling devices 138 of the freely rotating pinions 134 and 135 of the third and fifth gear ratios, via a first fork 221, or with a second dog sleeve 230 for controlling the input clutch 113 via a second fork 231.

The control system comprises a second electromechanical actuator 212, in a lateral position, the finger 213 of which can cooperate with a dog sleeve 240 for controlling the coupling devices 138 of the freely rotating pinions 136 and 137 of the second and fourth gear ratios, via a fork 241. Finally, a manual control device 250 allows the finger 251 to cooperate with the dog sleeve 260 for engaging the first and reverse gear ratio, via the fork 252.

According to the invention, the figures show the specific position of the electric machine 200 laterally with respect to the engine and substantially at the usual location of the starter, this arrangement thus not increasing the length of the power train 10.

FIG. 2 shows the compatibility of the control device, of the spindles of the forks 221, 231, 241 and of the actuators with the connection by the chain 203 of the electric machine 200 and the primary shaft 130 of the gearbox 100.

FIG. 1 shows the absence of a device for reverse operation. The fixed pinion for reversing is advantageously replaced on the primary shaft 130 by the fixed drive wheel 132 of the electric machine 200. Thus, according to the invention, the drive system of the electric machine, consisting of the wheels 132, 202 and of the chain 203, does not increase the length of the gearbox 100 and, therefore, does not increase the length of the power train 10.

According to the invention, the electric machine is permanently connected to the primary shaft 130 of the gearbox 100. It is therefore possible to use the electric machine:

- as a starter, provided that the gearbox is in neutral and the clutch 113 is closed,
- as an alternator when the vehicle is stopped, provided that the gearbox is in neutral and the clutch 113 is closed,
- as a booster when running at whatever gearbox ratio to impart additional torque to the combustion engine at low speeds,
- as an energy recovery means for the slowing of the vehicle in any gearbox ratios, apart from the first gear ratio,
- in electric drive mode, with the combustion engine rotating or stopped, in reverse operation when reversing the direction of rotation of the electric machine 200 and by using the second gear ratio 137, 145 coupled by the device 138 activated by the lateral actuator 212, since the upper actuator 210 keeps the clutch 113 open in order to disengage the combustion engine 20,
- in electric drive mode, with the combustion engine rotating or stopped, in forward operation by using the first gear ratio 133, 141 or second gear ratio 137, 145 coupled by the device 138 activated by the lateral actuator 212, since the upper actuator 210 keeps the clutch 113 open in order to disengage the combustion engine 20: the electric machine is thus able to propel the vehicle in forward operation in the first and second gear ratios of the gearbox, and in reverse operation by reversing the direction of rotation, in the second gear ratio, and
- in electric drive mode, to start the combustion engine by closing the clutch 113 so as to use the energy of the electric machine or the kinetic energy of the vehicle.

The invention claimed is:

1. A hybrid motor vehicle power train operating in combustion mode or in electric mode, and comprising:
    a gearbox including a primary shaft;
    a clutch including a clutch housing;
    a combustion engine including a crankshaft coupled to the gearbox via the clutch, and
    an electric machine positioned within the clutch housing and permanently connected to the primary shaft of the gearbox, and the electric machine is offset in a lateral direction with respect to the combustion engine such that the electric machine overlaps the combustion engine in a radial direction from an axis of the crankshaft,
    wherein
    the primary shaft bears
        a first fixed toothing to drive the electric machine in the combustion mode or to run forward or in reverse in the electric mode according to a direction of rotation of the electric machine,
        a second fixed toothing of a first gear ratio,
        at least four freely rotating pinions of higher gear ratios, and
        a fixed drive wheel,
    a secondary shaft bears a freely rotating pinion of the first gear ratio and at least four fixed toothings of higher gear ratios,
    the electric machine is connected to the fixed drive wheel by a chain, and
    the fixed drive wheel is not directly coupled to any pinion or fixed toothing on the secondary shaft.

2. The power train as claimed in claim 1, wherein the electric machine is connected to the primary shaft of the gearbox by a chain.

3. The power train as claimed in claim 1, wherein the freely rotating pinion of the first gear ratio is mounted on a free wheel.

4. The power train as claimed in claim 1, wherein the freely rotating pinions of the higher gear ratios can be secured with their shaft by conical couplers.

5. The power train as claimed in claim 1, wherein the electric machine reverses a running direction of a vehicle by reversing a direction of rotation of the first fixed toothing and by using a pinion of a second gear ratio of the at least four freely rotating pinions of higher gear ratios.

6. The power train as claimed in claim 1, further comprising a control system that engages and disengages the second fixed toothing of the first gear ratio, the at least four freely rotating pinions of the higher gear ratios, and the clutch.

7. The power train as claimed in claim 6, wherein the control system comprises at least one actuator and at least one mechanism, the at least one actuator actuating the at least one mechanism to engage and disengage the second fixed toothing of the first gear ratio, the at least four freely rotating pinions of the higher gear ratios, and the clutch.

8. The power train as claimed in claim 6, wherein the control system comprises
    a first mechanism that controls a coupling device of freely rotating pinions of a third gear ratio and a fifth gear ratio,
    a second mechanism that engages and disengages the clutch,
    a third mechanism that controls a coupling device of freely rotating pinions of a second gear ratio and a fourth gear ratio,
    a substantially vertical actuator that cooperates with the first mechanism and the second mechanism,
    a substantially lateral actuator that cooperates with the third mechanism, and
    a control device that cooperates with a fourth mechanism to engage and disengage the second fixed toothing of the first gear ratio.

9. The power train as claimed in claim 1, wherein the electric machine is positioned in place of a starter such that the electric machine is configured to start the combustion engine.

10. The power train as claimed in claim 1, further comprising:
    a damper positioned between the crankshaft of the combustion engine and the clutch.

11. The power train as claimed in claim 10, wherein the clutch housing comprises a first compartment closed by a flange and containing a conical clutch connected to the damper.

* * * * *